(12) United States Patent
Soares et al.

(10) Patent No.: US 12,249,224 B2
(45) Date of Patent: Mar. 11, 2025

(54) FIXING SYSTEM FOR MOUNTING A CAMERA TO A SUPPORT STRUCTURE

(71) Applicant: Robert Bosch GmbH, Stuttgart (DE)

(72) Inventors: Daniel Soares, Valongo (BR); Carlos Antonio Ribeiro, Maia (PT); Francisco Homem, Eindhoven (NL); Ugur Unal, Veldhoven (NL)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 18/174,964

(22) Filed: Feb. 27, 2023

(65) Prior Publication Data
US 2023/0274627 A1    Aug. 31, 2023

(30) Foreign Application Priority Data

Feb. 28, 2022  (EP) .................................... 22159195

(51) Int. Cl.
| G08B 13/196 | (2006.01) |
| F16M 11/04 | (2006.01) |
| G03B 17/56 | (2021.01) |

(52) U.S. Cl.
CPC ....... *G08B 13/19632* (2013.01); *F16M 11/04* (2013.01); *G03B 17/561* (2013.01)

(58) Field of Classification Search
None
See application file for complete search history.

(56) References Cited

U.S. PATENT DOCUMENTS

| 5,649,255 A * | 7/1997 | Schieltz | G08B 13/1963 |
| | | | 294/209 |
| 7,217,045 B2 * | 5/2007 | Jones | G08B 13/19632 |
| | | | 348/E5.026 |
| 8,480,317 B2 * | 7/2013 | Wang | G08B 13/19619 |
| | | | 396/427 |
| 2008/0211913 A1 * | 9/2008 | Togawa | G08B 13/1963 |
| | | | 348/E7.085 |
| 2009/0175612 A1 * | 7/2009 | Wen | G03B 15/03 |
| | | | 396/155 |

(Continued)

FOREIGN PATENT DOCUMENTS

| EP | 0852740 | 7/1998 |
| EP | 2187622 A1 | 5/2010 |
| EP | 3246615 A1 | 11/2017 |

OTHER PUBLICATIONS

Wikipedia, "Lens Mount," available at <https://en.wikipedia.org/w/index.php?title=Lens_mount&oldid=1068118370> web page visited Jul. 18, 2022 (9 pages).

*Primary Examiner* — Rodney E Fuller
(74) *Attorney, Agent, or Firm* — Michael Best & Friedrich LLP (57) ABSTRACT

A fixing system is disclosed for mounting a camera to a support structure. The fixing system comprises a mounting plate attachable to the support structure and a base detachably connectable to the mounting plate. The mounting plate includes a recess, and the base includes an index plunger with a pressure-loaded pin and a plunger head. When the base is connected to the mounting plate, the pressure-loaded pin of the index plunger is inserted in the recess of the mounting plate. Furthermore, the plunger head of the index plunger is accessible from a side of the base facing away from the mounting plate to pull the pressure-loaded pin out of the recess.

11 Claims, 6 Drawing Sheets

(56) References Cited

U.S. PATENT DOCUMENTS

2010/0245569 A1* 9/2010 Hakoishi ................ H04N 7/185
                                                                    348/143
2018/0288290 A1* 10/2018 Fujii ...................... H04N 23/54

* cited by examiner

FIXING SYSTEM FOR MOUNTING A CAMERA TO A SUPPORT STRUCTURE

BACKGROUND

The present invention relates to a fixing system for mounting a camera to a support structure, a camera including the fixing system, and methods for mounting and dismounting the fixing system.

Bullet shaped cameras are known in the prior art as surveillance or security cameras. Surveillance cameras are usually installed at some height where there is a risk of parts falling down due to gravity. Furthermore, conventional safety measures for installing surveillance cameras require an additional action by the user during installation. Other conventional safety systems also ensure that the user cannot overcome them, but this is typically achieved by adding an additional level of screws, which in that case is a less efficient design since it consumes additional labour/materials.

EP 3 246 615 A1 shows a bullet shaped camera including a mounting assembly which comprises an attachment part, a base, and an arm. The attachment part is coupled to the arm and the arm is coupled to the base such that the arm is lockingly rotatable relative the base about a rotational axis. The base comprises a plate member which is provided with holes for attaching the base to a surface.

SUMMARY

According to the invention, a fixing system for mounting a camera to a support structure, a camera including the fixing system, and methods for mounting and dismounting the fixing system having the features of the independent claims are disclosed. Further preferred developments are described by the dependent claims and the description below.

The invention enables a camera to be installed securely, as the parts of the fixing system are automatically locked in place by a simple twist and click movement, without the need for additional tools or screws. Thus, the design of the fixing system ensures a safe installation, and the user does not need to take any additional measures or understand the principle of the safety function.

A fixing system for mounting a camera to a support structure is provided which comprises a mounting plate attachable to the support structure, wherein the mounting plate includes a recess, which may preferably be a slotted hole. Preferably, the mounting plate is attached to the support structure using one or more screws.

Furthermore, the fixing system comprises a base which is detachably connectable to the mounting plate. The base includes an index plunger with a pressure-loaded pin and a plunger head. The pressure-loaded pin may be pressurized by a spring disposed inside the index plunger. If the base is connected to the mounting plate, the pressure-loaded pin of the index plunger is inserted in the recess of the mounting plate. In other words, the base is automatically locked to the mounting plate via the pressure-loaded pin of the index plunger. Furthermore, the plunger head of the index plunger is accessible from a side of the base facing away from the mounting plate to pull the pressure-loaded pin out of the recess.

Due to the index plunger included in the base, the base is automatically locked to the mounting plate during assembly via the pressure-loaded pin of the index plunger. Unlocking the base, on the other hand, requires a separate action, especially pulling the plunger head of the index plunger to move the pressure-loaded pin out of the recess. In other words, the index plunger allows for a quick and safe installation of the fixing system and provides an intrinsic safety feature which will auto lock the base to the mounting plate without the need of installation tools or additional action from a user. Furthermore, the index plunger prevents unintentional release of the base by requiring a separate operation to unlock the base.

According to an embodiment, the mounting plate includes one or more tabs arranged adjacent to an outer circumference of the mounting plate extending in radial direction towards the outer circumference of the mounting plate. According to a preferred embodiment, the recess is formed adjacent to one of the tabs, wherein an outer side surface of said tab is identical to an inner side surface of the recess.

Furthermore, the base can include one or more protrusions arranged on an outer circumference thereof and extending in radial direction towards the center of the base. The protrusions may be designed to accommodate the tabs of the mounting plate. Preferably, the one or more protrusions extend in the radial direction by a predetermined length. The length of the protrusions can be chosen to prevent the tabs from jamming during assembly and at the same time ensure a secure connection of the base to the mounting plate. Preferably, the protrusions of the base form a positive connection with the tabs of the mounting plate in an assembled state.

Most preferably, the base is configured to be detachably connected to the mounting plate by aligning the base to the mounting plate and rotating it (in clockwise or counter-clockwise direction) until a tip portion of each of the one or more tabs of the mounting plate is positioned behind each of the one or more protrusions of the base and the pressure-loaded pin of the index plunger is inserted in the recess of the mounting plate. In other words, as the base rotates relatively to the mounting plate, the tabs of the mounting plate are pushed behind the protrusions and the pressure-loaded pin is automatically inserted into the recess in the mounting plate, so that the base is simultaneously connected and locked to the mounting plate. This means that no additional measures are required from a user to secure the base to the mounting plate, which increases the safety of the fixing system.

Preferably, the rotation of the base relatively to the mounting base may be limited by a stop incorporated in the base when rotating the base in a first direction. In case the pressure-loaded pin is inserted in the recess, a rotation of the base in a second direction, opposite to the first direction, may be prevented by the pressure-loaded pin acting against the recess, preferably in form of the outer side surface of the adjacent tab.

According to an embodiment, the one or more tabs of the mounting plate are bent out of a plane of the mounting plate. Preferably, the tabs of the mounting plate are bent towards the base when the base is assembled to the mounting plate so that they can be easily engaged with the protrusion of the base.

The base may include one or more springs, which push against a middle portion of the one or more tabs of the mounting plate when the base is connected to the mounting plate. The middle portion may be a portion adjacent to the tip portion of the tabs. Preferably the springs may be leaf springs. By placing the springs opposite the middle portion of the tabs adjacent to their tip portion, the springs may press the tip portion of the tabs against the protrusions of the base. This allows for taking away axial clearances and having a defined position between the mounting plate and the base. In addition, the springs provide resistance to angular movement.

According to an embodiment, the base includes a tether connectable to a base cover providing a safety means for the base cover and a camera body attached thereto. The tether may include a hook or snap hook to connect it to, e.g., an eyelet that may be attached to the base cover. This means that even if the base cover is unscrewed, it still is connected to the base in order to prevent the base cover from falling down together with the camera body. As the index plunger safely connects the base to the mounting plate, the weight of the base cover (and camera body) connected to the tether will not cause the base to detach by rotating relative to the mounting plate. Preferably, the tether is a retractable tether. This allows for easily positioning the tether inside the base.

Additionally, a camera is provided which comprises the above-described fixing system, a base cover and a camera body attached to the base cover. Preferably, the camera is a bullet shaped camera.

According to an embodiment of the camera, the base cover is fixed by screws through the base to the mounting plate. In other words, in a fully assembled state, the base cover together with the camera body is screwed to the mounting plate, so the tabs of the mounting plate that engage with the base do not need to support the load of the camera after the installation is complete.

Preferably, the plunger head is covered by the base cover so that the plunger head cannot be pulled and the base cannot be unlocked without removing the base cover. This further improves the secure mounting of the camera.

Additionally, a method for mounting the above-described fixing system to a support structure is provided, wherein the method comprises a first step of attaching the mounting plate to the support structure, a second step of aligning the base to the mounting plate, and a third step of rotating the base until the pressure-loaded pin of the index plunger is inserted in the recess of the mounting plate.

In other words, to mount the fixing system for holding a camera to a support structure, the mounting plate is firstly attached to the support structure. Preferably, the mounting plate is fixed to the support structure with one or more screws. The screws can be attached e.g., with plugs in corresponding holes in the support structure.

Subsequently, the base is aligned to the mounting plate, that is the base is positioned relative to the mounting plate so that its protrusions are arranged circumferentially adjacent to the tabs of the mounting plate in front view of the base. In addition, during the alignment step, the base is pushed towards the mounting plate before the third step of rotating the base is performed. The mounting plate and the base are designed in such a way, that pushing the base, especially in parallel, towards the mounting plate is only possible in predetermined alignment of the mounting plate relatively to the base. Further, by pushing the base towards the mounting plate the tab moves the pressure-loaded pin into the interior of the index plunger, especially against the spring force. Further the two other tabs are pressed against the springs. In the third step, the base is rotated, especially while the pressure-loaded pin remains into the interior of the index plunger by fixation by the relatively to the base rotating tab, until the base is locked by the index plunger by releasing the pressure-loaded pin, that is until the pressure-loaded pin of the index plunger is inserted in the recess of the mounting plate. Thus, the tab presses the pressure-loaded pin into the interior of the index plunger during alignment and/or rotation, and/or the tab releases the pressure-loaded pin for locking the base. According to a preferred embodiment, the recess is formed adjacent to one of the tabs, wherein an outer side surface of said tab is identical to an inner side surface of the recess.

The insertion of the pressure-loaded pin into the recess may result in a corresponding noise ("click") which is clearly perceptible to a user. This means that the angle of rotation of the base is predetermined by the position of the recess in the mounting plate relative to the position of the index stamp in the base. The angle of rotation defined in this way also ensures that the tabs are pushed sufficiently behind the protrusions during rotation. Additionally, a stop may be incorporated into the base that limits the rotation of the base relatively to the mounting base when rotating the base in a first direction and a rotation of the base in a second direction, opposite to the first direction, may be prevented by the pressure-loaded pin abutting against the outer side surface of the recess.

Preferably, if the pressure loaded pin is not inserted in the recess of the mounting plate after the third step, the plunger head of the index plunger is pulled out, and the second step and the third step are repeated. In other words, if the alignment of the base is not done correctly, the rotation may not result in a connection between the tabs and the protrusions, so the index plunger will not make the lock properly. In this case, the plunger head of the index plunger is pulled out, to ensure that the pressure-loaded pin is not jammed on any part of the mounting plate, and the steps of alignment and rotation are repeated.

In a further advantageous step the base cover is fixed by screws through the base to the mounting plate. Preferably, the base cover cannot be screwed onto the mounting plate if the pressure-loaded pin has not inserted in the recess, as the plunger head then abuts against the base cover.

Additionally, a method for dismounting the above-described fixing system from a support structure is provided, wherein the method comprises a first step of pulling the plunger head of the index plunger to move the pressure-loaded pin from the recess of the mounting plate, a second step of rotating the base until the base is disconnected from the mounting plate while the pressure-loaded pin remains in the interior of the index plunger by pulling the plunger head and/or by the relatively to the base rotating tab, and a third step of detaching the mounting plate from the support structure. In other words, to disassemble the fixing system for holding a camera from a support structure, the plunger head of the index plunger must first be pulled to unlock the base from the mounting plate. This step prevents unintentional loosening of the fixing system as it requires a deliberate action of a user. If the base is unlocked by pulling the plunger head of the index plunger, it can subsequently be rotated until the tabs of the mounting plate are no longer connected to the protrusions of the base. This allows the base to be released from the mounting plate. If the camera is to be completely dismantled, the last step is to detach the mounting plate from the support structure. This step may not always be necessary, e.g. if only the camera is being serviced.

Preferably, if the base is not disconnected from the mounting plate after the second step, the first step and the second step are repeated. In other words, the index plunger will lock the base again if it is not completely removed. Therefore, the steps of unlocking and rotating the base are repeated.

If the base cover is mounted to the base and the mounting plate, before the first step of pulling the plunger head of the index plunger, the base cover needs to be dismounted from the base and the mounting plate.

Summarizing, the invention allows for a secure installation of a camera, as the parts of the fixing system are automatically locked in place by a simple twist and click movement, without the need for additional tools or screws. Thus, the design of the fixing system ensures a safe installation, and the user does not need to take any additional measure.

BRIEF DESCRIPTION OF THE DRAWINGS

Further advantages and embodiments of the invention are shown in the following description and the accompanying figures. The invention is illustrated schematically by means of examples in the figures and is described below with reference to the figures. The same elements are provided with the same reference signs so that a repeated description is dispensed if not needed.

DETAILED DESCRIPTION

Figure 1:
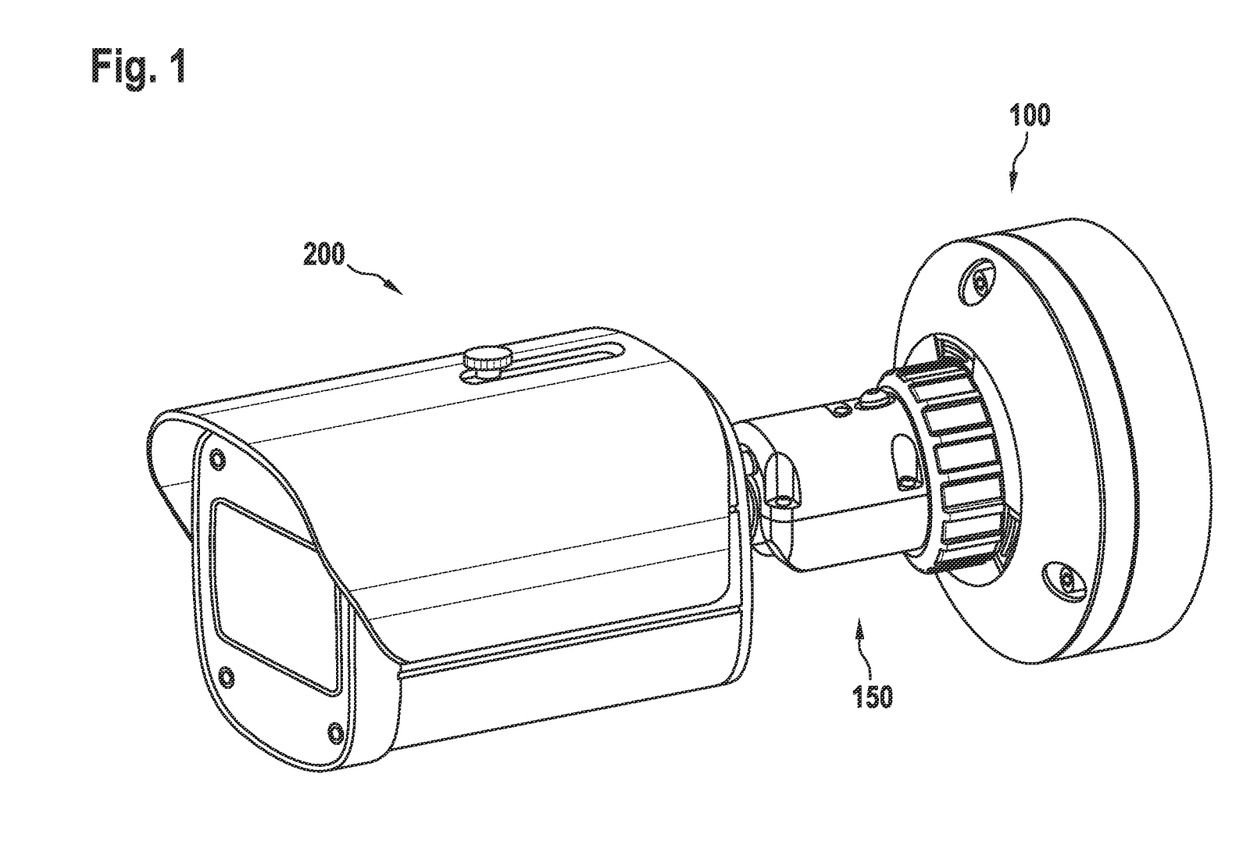
FIG. 1 shows an example of a bullet shaped camera according to a preferred embodiment of the present invention in a perspective view.

FIG. 1 shows an embodiment of the bullet shaped camera according to a preferred embodiment of the invention. The camera comprises a mounting box 100, for installing the camera to a support structure like a wall or ceiling. Moreover, the electrical/signal connections are made inside the mounting box 100. A camera body 200, which houses the camera head with the viewing lens and the sensor, is connected to the mounting box 100 via a swivel mechanism 150.

Figure 2:
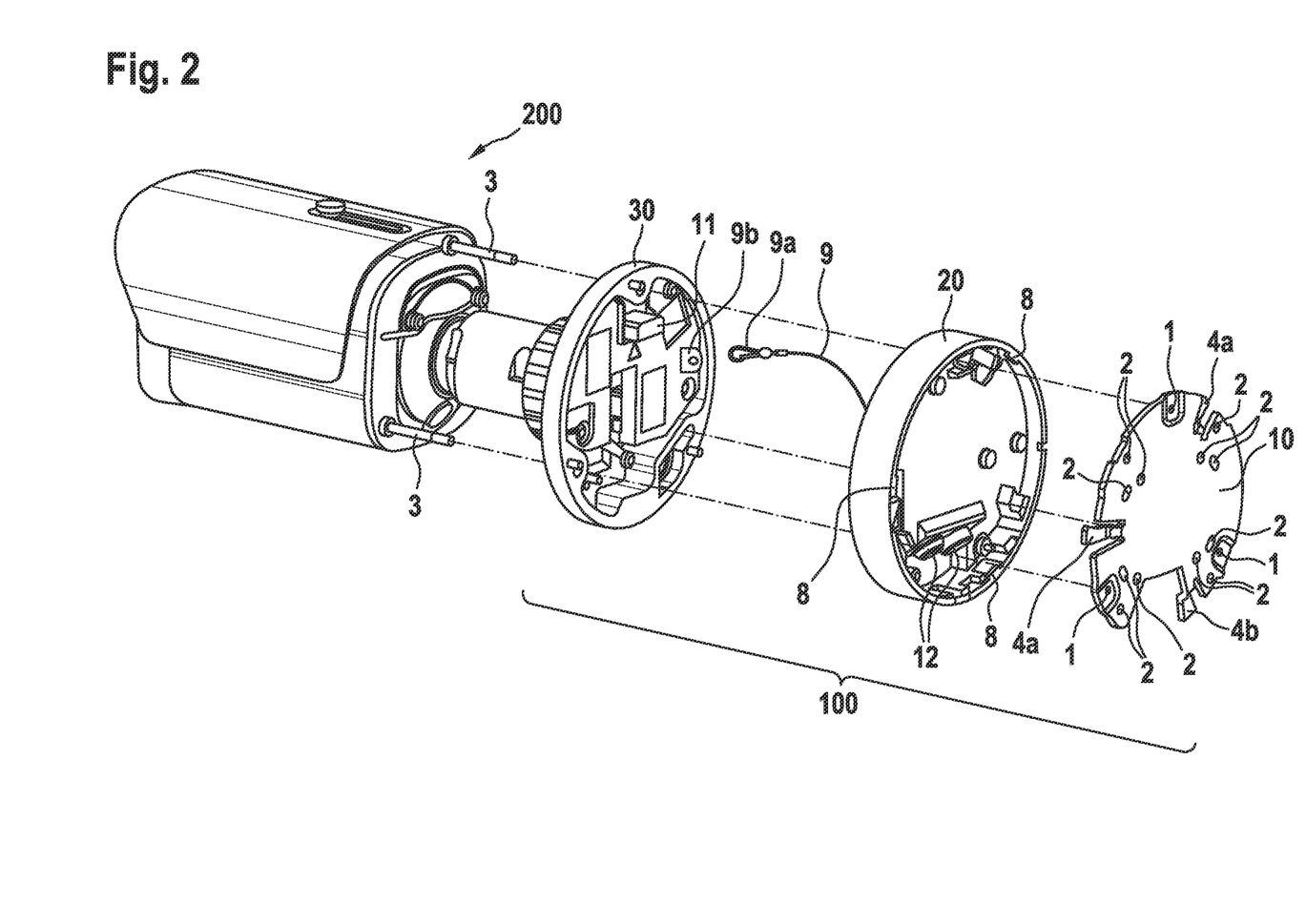
FIG. 2 shows the bullet shaped camera of FIG. 1 from a different angle with an exploded view of its mounting box.

FIG. 2 shows the bullet shaped camera of FIG. 1 from a different angle with an exploded view of its mounting box 100. The mounting box 100 includes a mounting plate 10, a base 20 and a base cover 30. The mounting plate 10 provides the connection of the mounting box 100 to a support structure, while the base 20 and the base cover 30 provide the electrical connections 11 and the cable ducts 12 to the camera body 200.

The depicted mounting plate 10 comprises three different patterns of fixing holes 2 each including four holes 2 for rigidly fixing it to a wall or a ceiling. In addition, the mounting plate 10 has three tabs 4a, 4b, 4c for connecting the base 20 to the mounting plate 10. The tabs 4a, 4b, 4c are bent out of a plane of the mounting plate towards the base 20, to facilitate the connection of the base 20 to the mounting plate 10. The base 20 has three protrusions 8 which engage the tabs 4a, 4b, 4c of the mounting plate 10 when connecting the base 20 to the mounting plate.

Moreover, the mounting plate has three threaded holes 1 for receiving screws 3 by which the base cover 30 can be fixed together with the camera housing 200 to the mounting plate (see broken lines from the screws 3 to the threaded holes 1). This means that in a fully assembled state, the base cover 20 together with the camera body 200 is screwed to the mounting plate 10, so that the tabs 4a, 4b of the mounting plate 10 that engage with the protrusions 8 of the base 20 do not need to support the load of the camera after the installation is complete.

Furthermore, the base 10 comprises a tether 9 with a snap hook 9a which is connectable to an eyelet 9b arranged on a side of the base cover 30 facing the base 20. This means that even if the base cover 30 is unscrewed, it can still be connected to the base 20 in order to prevent the base cover 30 from falling down together with the camera body 200.

Figure 3:
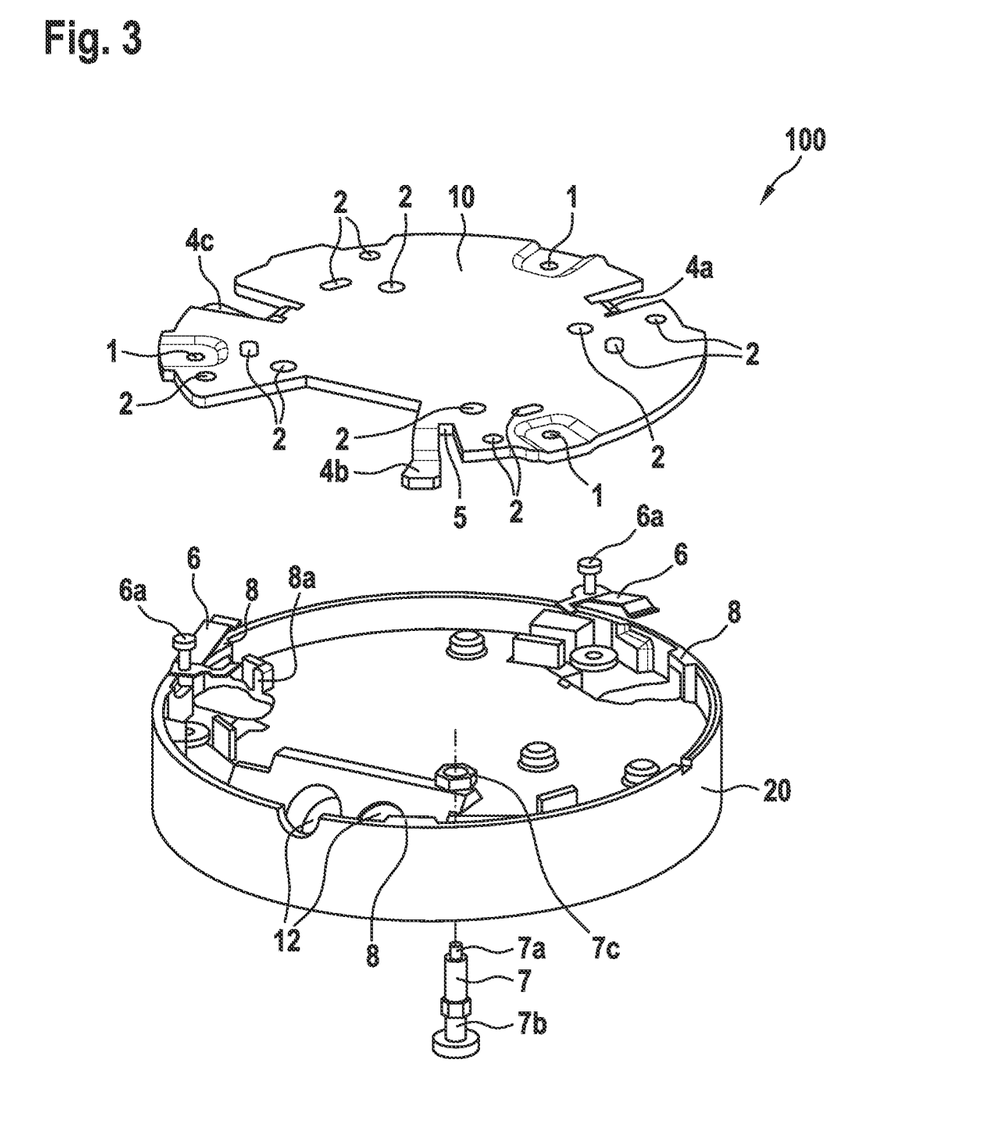
FIG. 3 shows the different parts of the mounting box depicted in FIG. 2 in an exploded view.

FIG. 3 shows the different parts of the mounting box 100 depicted in FIG. 2 in an exploded view. In particular, FIG. 3 shows the elements of the mounting plate 10 and the base 20 used for safely fixing the base 20 to the mounting plate 10.

The mounting plate 10 is shown in a perspective view, looking at the back side thereof, i.e., the side facing the support structure. The mounting plate 10 may be made of a metal material such as steel and may be screwed to the support structure such as a wall or ceiling. In terms of the mounting plate 10, the fixing elements comprise the tabs 4a, 4b and 4c and a recess 5. It can be seen that the tabs 4a, 4b, 4c are bent out of the plane of the mounting plate 10 towards the base 20 so that they can be easily engaged with the protrusion of the base.

The recess 5 is formed as a slotted hole and positioned adjacent to one of the tabs 4b. In other words, the shape of the recess 5 is adapted to the shape of the adjacent tab 4b, which may facilitate the production of the mounting plate 10. In an assembled state of the fixing system, the recess 5 accommodates a pressure-loaded pin 7a of an index plunger 7 for locking the base 20 to the mounting plate 10.

The depicted base 20 includes three protrusions 8 which are arranged on an outer circumference thereof, here in the form of a cylindrical wall. The protrusions 8 extend in radial direction towards the center of the base 20 by a certain length. The length of the protrusions 8 can be chosen to prevent the tabs 4a, 4b, 4c from jamming during assembly and at the same time ensure a secure connection of the base 20 to the mounting plate 10. Furthermore, a stop 8a is incorporated in the base 20 which may limit the rotation of the base during assembly. In an assembled state, the three protrusions 8 of the base 20 form a positive connection with the three tabs 4a, 4b, 4c of the mounting plate 10. Additionally, the tab 4c abuts against the stop 8a preventing further rotation to ensure proper alignment of the screws 3 of the base cover to the mounting plate.

In order to support the positive connection between the tabs 4a, 4b, 4c and the protrusions 8, the base 20 further includes two springs 6, each being attached to the bottom of the base 20 by a screw 6a (see broken lines from the screws 6a to the respective connection point at the bottom of the base 20). The springs 6 may be leaf springs. Each spring 6 extends under a certain angle from the bottom of the base when assembled. The spring 6 has a geometry that contacts with the edge of the tabs 4a, 4c exerting a resistance torque against disassembly.

The spring effect of the springs 6 against the tabs 4a, 4c allows for a secure connection defined position between the mounting plate 10 and the base 20.

The index plunger 7 for locking the base 20 to the mounting plate 10 is pushed into the base 20 via a hole (not depicted) and fixed to it with a nut 7c (see broken lines from the index plunger 7 to the nut 7c). The index plunger 7 comprises a pressure-loaded pin 7a and a plunger head 7b. The pressure-loaded pin 7a may be pressurized by a spring disposed inside the index plunger 7. By pulling the plunger head 7*b*, the pressure-loaded pin 7*a* is moved into the interior of the index plunger 7 against the spring force. In this way the pressure-loaded pin can be moved out of the recess 5 and the base 20 can be unlocked from the mounting plate 10.

In terms of the base 20, the fixing elements comprise the protrusions 8, which accommodate the tabs 4*a*, 4*b*, 4*c* of the mounting plate 10 in an assembled state of the fixing system, the springs 6, which support the contact between the tabs 4*a*, 4*c* and the protrusions 8, and the index plunger 7, which locks the base 20 to the mounting plate 10 via the recess 5.

Figure 4A:
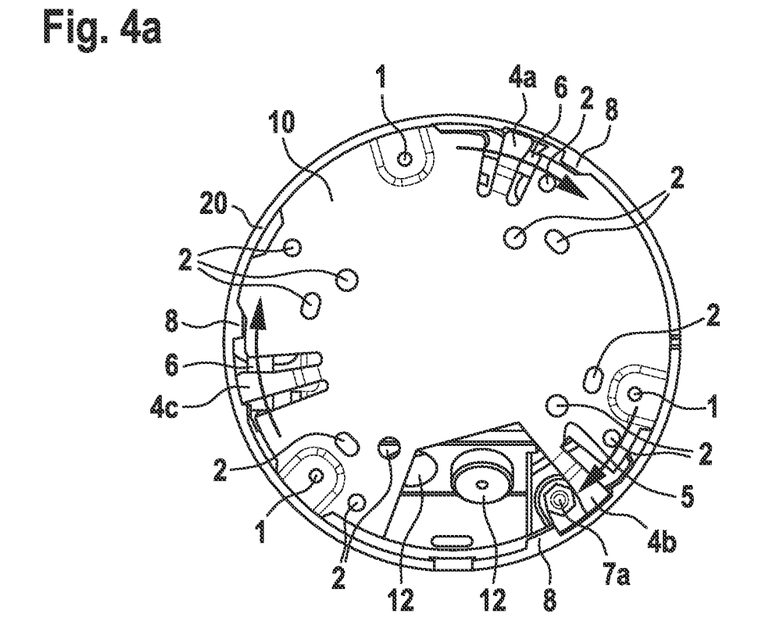
FIGS. 4a and 4b show an example of connecting a base to a mounting plate according to a preferred embodiment of the present invention.
Figure 4B:
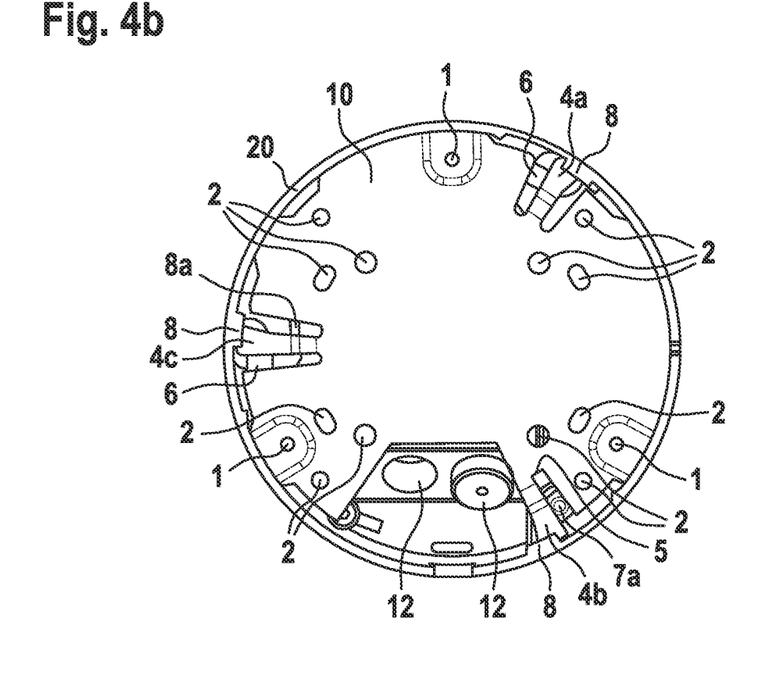

FIGS. 4*a* and 4*b* show an example of connecting a base 20 to a mounting plate 10 according to a preferred embodiment of the present invention. In both figures, the fixing system is shown in a back view. FIG. 4*a* illustrates the alignment of the base 20 to the mounting plate 10 before rotation. The subsequent (here clockwise) rotation of the base 20 is indicated by three arrows. In the position shown in FIG. 4*a*, the base 20 is aligned with the mounting plate 10 such that two of the tabs 4*a*, 4*c* are pressed against the springs 6. The required pressure on the base 20 against the pressure of the springs 6 may stabilize the position of the base 20 during the subsequent rotation.

In the depicted back view, the pressure-loaded pin 7*b* of the index plunger 7 is circumferentially positioned to the left of the third tab 4*b*, and each tab 4*a*, 4*b*, 4*c* of the mounting plate 10 is also located to the left of the three protrusions 8 of the base 20 in the circumferential direction. By rotating the base 20 in clockwise direction, the position depicted in FIG. 4*b* can be achieved.

FIG. 4*b* illustrates the position of the base 20 on the mounting plate 10 in the assembled state. It can be seen in FIG. 4*b* that in this state the tip portion of the tabs 4*a*, 4*b*, 4*c* is engaged with the protrusions 8 of the base 20, and the pressure-loaded pin 7*a* of the index plunger 7 is engaged with the recess 5 of the mounting plate 10. Furthermore, the springs 6 are positioned on the middle part of the tabs 4*a*, 4*c* adjacent to the tip portion thereof, to support the contact between the tabs 4*a*, 4*c* and the corresponding protrusions 8. In terms of the third tab 4*b*, the pressure-loaded pin 7*a*, which is in contact with a side surface of the tab 4*b*, prevents rotation in counterclockwise direction, and the stop 8*a* implemented in the base 20 prevents rotation in clockwise direction against a side surface of the tab 4*c*.

Figure 5A:
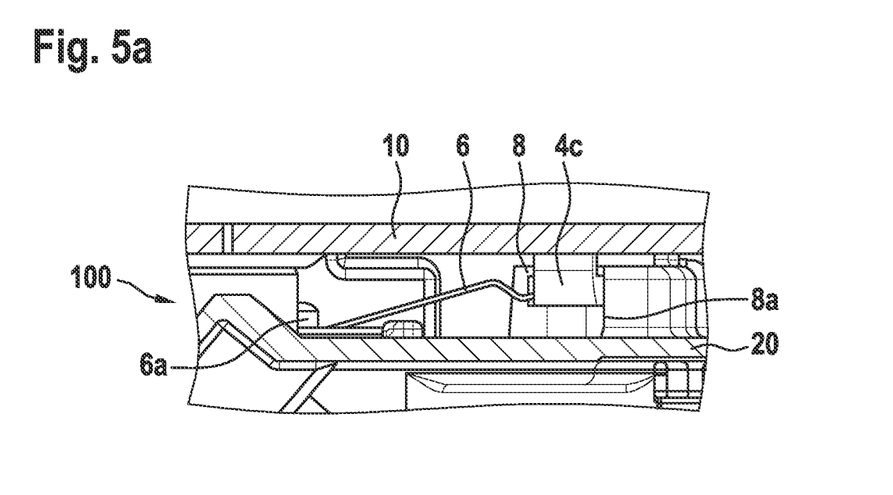
FIGS. 5a to 5c show details of the different parts of the mounting box depicted in FIG. 3.
Figure 5B:
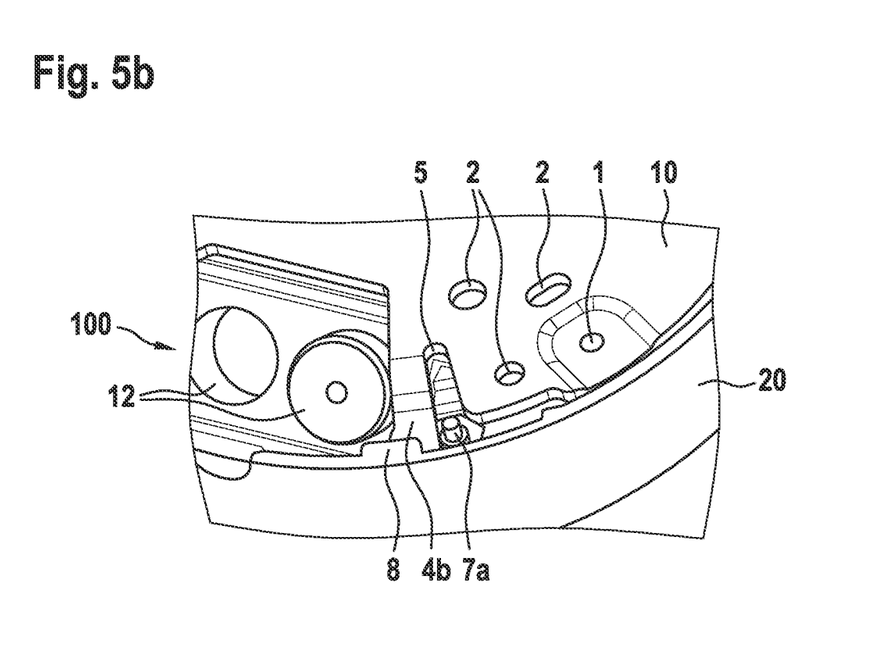
Figure 5C:
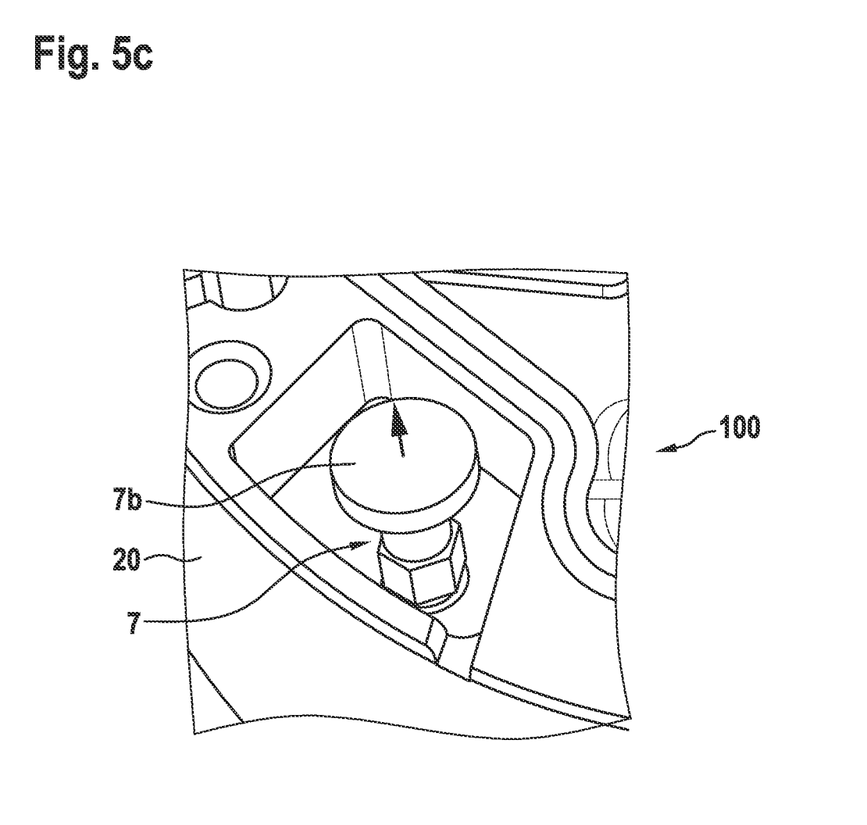

FIGS. 5*a* to 5*c* show details of the different parts of the mounting box depicted in FIG. 3.

FIG. 5*a* depicts a section of the mounting box 100 showing the base 20, the mounting plate 10, one of the springs 6 and the corresponding tab 4*c* on which the spring 6 acts. The spring 6 is attached to the bottom of the base 20 via a screw 6*a*. It can be seen that the spring 6, due to its shape and position in the base 20, presses the tab 4*c* against the protrusion 8 which is arranged on an outer circumference of the base 20. Furthermore, the tab 4*c* abuts against the stop 8*a* implemented in the base 20. This ensures a secure defined fit of the base 20 on the mounting plate 10 and prevents the parts from rattling, e.g., due to wind.

FIG. 5*b* shows a section of the mounting box 100 in a perspective view, looking at the back side of the mounting plate 10, i.e., the side facing the support structure. The mounting box 100 is shown in an assembled state, that is the mounting plate 10 is connected to the base 20 via the tabs 4 and locked by the index plunger 7. The depicted section shows the part of the mounting plate 10 and the base 20 including the recess 5 in which the pressure-loaded pin 7*a* of the index plunger 7 is inserted. Next to the recess 5 one of the tabs 4*b* is arranged, which in the depicted connected state is positioned behind the respective protrusion 8 of the base 20. It is visible in FIG. 5*b* that the outer side surface of the tab 4*b* facing the pressure-loaded pin 7*a* forms an inner side surface of the recess 5. Said side surface abuts against the pressure loaded pin 7*a* when the base 20 is rotated in counterclockwise direction without pulling the plunger head 7*b*.

FIG. 5*c* depicts a section of the mounting box in a perspective view, looking at the base from a side opposite the mounting plate 10. The depicted section shows the part of the base 20 at which the index plunger 7 is arranged. It is visible that the index plunger 7 is arranged in a deepening of the base 20 providing good access to the plunger head 7*b*. The depicted arrow illustrates that the button 7*b* must be pulled to unlock the base 20 and release it from the mounting plate 10.

Again summarizing, the invention allows for a secure installation of a camera, as the parts of the fixing system are automatically locked in place by a simple twist and click movement, without the need for additional tools or screws. Thus, the design of the fixing system ensures a safe installation, and the user does not need to take any additional measures.

The invention claimed is:

1. A fixing system for mounting a camera to a support structure, the fixing system comprising:
   a mounting plate (10) attachable to the support structure, the mounting plate (10) including a recess (5), and
   a base (20) detachably connectable to the mounting plate (10), the base (20) including an index plunger (7) with a pressure-loaded pin (7*a*) and a plunger head (7*b*), wherein, when the base (20) is connected to the mounting plate (10),
   the pressure-loaded pin (7*a*) of the index plunger (7) is inserted in the recess (5) of the mounting plate (10), and
   the plunger head (7*b*) of the index plunger (7) is accessible from a side of the base (20) facing away from the mounting plate (10) to pull the pressure-loaded pin (7*a*) out of the recess (5).

2. The fixing system according to claim 1, wherein
   the mounting plate (10) includes one or more tabs (4*a*, 4*b*) arranged adjacent to an outer circumference of the mounting plate (10) extending in radial direction towards the outer circumference of the mounting plate (10), and
   the base (20) includes one or more protrusions (8) arranged on an outer circumference of the base (20) extending in a radial direction towards a center of the base (20), and wherein
   the base (20) is configured to be detachably connected to the mounting plate (10) by aligning the base to the mounting plate (10) and rotating the base until a tip portion of each of the one or more tabs (4*a*, 4*b*) of the mounting plate (10) is positioned behind each of the one or more protrusions (8) of the base and the pressure-loaded pin (7*a*) of the index plunger (7) is inserted in the recess (5) of the mounting plate (10).

3. The fixing system according to claim 2, wherein
   the one or more tabs (4*a*, 4*b*) are bent out of a plane of the mounting plate (10), and
   the base (20) includes one or more springs (6), which are pushed against a middle portion of the one or more tabs (4*a*, 4*b*) of the mounting plate (10) when the base (20) is connected to the mounting plate (10).

4. The fixing system according to claim 1, wherein
the base (20) includes a tether (9) connectable to a base cover (30) providing a safety connection to the base cover (30).

5. The fixing system according to claim 4, wherein the tether (9) is a retractable tether.

6. A camera comprising
the fixing system according to claim 1,
a base cover (30); and
a camera body (200) attached to the base cover (30).

7. The camera according to claim 6, wherein
the base cover (30) is fixed by screws (3) through the base (20) to the mounting plate (10).

8. A method for mounting a camera to a support structure, including for mounting the fixing system according to claim 1 to a support structure, the method comprising:
attaching a mounting plate (10) to the support structure,
aligning a base (20) to the mounting plate (10), and
rotating the base (20) until a pressure-loaded pin (7a) of an index plunger (7) is inserted in a recess (5) of the mounting plate (10).

9. The method according to claim 8, wherein, if the pressure-loaded pin (7a) is not inserted in the recess (5) of the mounting plate (10) after the rotating step, the plunger head (7b) of the index plunger (7) is pulled out, and the aligning step and the rotating step are repeated.

10. A method for dismounting a camera from a support structure, including for dismounting the fixing system according to claim 1 from a support structure, the method comprising
pulling a plunger head (7b) of an index plunger (7) to move a pressure-loaded pin (7a) from a recess of a mounting plate,
rotating a base (20) until the base (20) is disconnected from the mounting plate (10), and
detaching the mounting plate (10) from the support structure.

11. The method according to claim 10, wherein, if the base (20) is not disconnected from the mounting plate (10) after the rotating step, the pulling step and the rotating step are repeated.

* * * * *